US009802239B2

(12) United States Patent
Butcher et al.

(10) Patent No.: US 9,802,239 B2
(45) Date of Patent: *Oct. 31, 2017

(54) ROTARY VALVE SYSTEM

(71) Applicant: Stolle Machinery Company, LLC, Centennial, CO (US)

(72) Inventors: Gregory H. Butcher, Columbus, OH (US); Robert D. Turnbull, Massillon, OH (US); Neil A. Zumberger, Sidney, OH (US); Stephen P. Ripple, Canton, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,528

(22) Filed: Sep. 26, 2016

(65) Prior Publication Data

US 2017/0072449 A1 Mar. 16, 2017

Related U.S. Application Data

(63) Continuation of application No. 13/602,712, filed on Sep. 4, 2012, now Pat. No. 9,476,512.

(51) Int. Cl.
*B21D 45/02* (2006.01)
*F16K 3/08* (2006.01)
*F16K 11/074* (2006.01)
*B21D 22/28* (2006.01)
*B21D 45/04* (2006.01)

(52) U.S. Cl.
CPC ............. *B21D 45/02* (2013.01); *B21D 22/28* (2013.01); *F16K 3/085* (2013.01); *F16K 11/074* (2013.01); *B21D 45/04* (2013.01)

(58) Field of Classification Search
CPC ....... F16K 11/074; F16K 3/085; B21D 45/02; B21D 45/04; B21D 45/06; B21D 45/065; B30B 15/16; B30B 15/166; B30B 15/26; B30B 9/125; B23Q 7/006
See application file for complete search history.

(56) References Cited

U.S. PATENT DOCUMENTS

| 1,723,959 A | 8/1929 | Thomson |
| 3,713,462 A | 1/1973 | Bushee |
| 3,893,832 A | 7/1975 | Perry et al. |
| 4,248,076 A | 2/1981 | Bulso, Jr. et al. |
| 4,343,173 A | 8/1982 | Bulso, Jr. et al. |
| 4,416,140 A | 11/1983 | Bulso, Jr. et al. |
| 4,826,382 A | 5/1989 | Bulso, Jr. et al. |

(Continued)

FOREIGN PATENT DOCUMENTS

DE 652811 11/1937

*Primary Examiner* — R. K. Arundale
*Assistant Examiner* — Pradeep C Battula
(74) *Attorney, Agent, or Firm* — Eckert Seamans Cherin & Mellott, LLC; David C. Jenkins

(57) ABSTRACT

The disclosed and claimed compressed gas system provides for the use of a rotary valve assembly in association with a cupper. A compressed gas system that utilizes a rotary valve assembly uses less gas than a constant flow compressed gas system and is quieter than a compressed gas system that uses valves. The rotary valve is a disk-like body having an opening therethrough. The rotary valve body is disposed within a housing assembly wherein gas may only flow through the housing when the rotary valve body is properly aligned with a space on one side of the rotary valve body.

10 Claims, 8 Drawing Sheets

(56) References Cited

U.S. PATENT DOCUMENTS

| | | |
|---|---|---|
| 5,209,098 A | 5/1993 | Cudzik |
| 5,272,901 A | 12/1993 | Cudzik |
| 5,331,836 A | 7/1994 | Cudzik |
| 5,470,464 A | 11/1995 | Priegnitz |
| 5,492,200 A | 2/1996 | Korhonen |
| 5,628,224 A | 5/1997 | McClung et al. |
| 6,014,883 A | 1/2000 | McClung |
| 6,755,895 B2 | 6/2004 | Lomax, Jr. et al. |
| 7,644,678 B2 | 1/2010 | Carstens et al. |
| 2007/0246678 A1 | 10/2007 | Michaels |
| 2013/0309043 A1 | 11/2013 | McClung et al. |

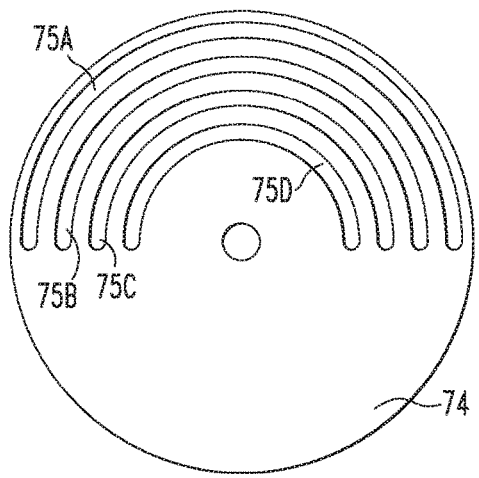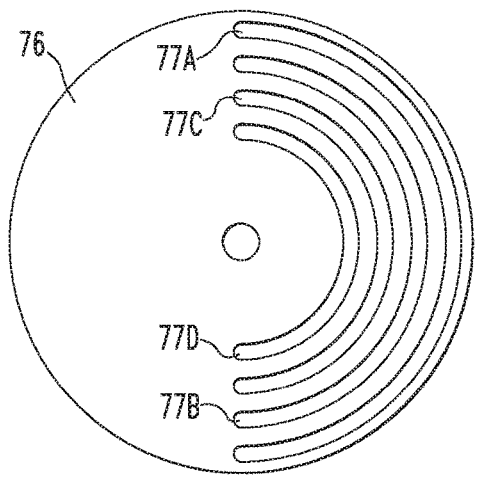
FIG.6A  FIG.6B
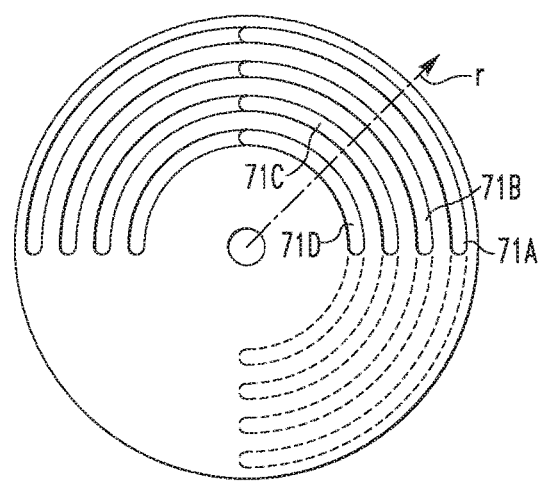
FIG.6C

ROTARY VALVE SYSTEM

CROSS REFERENCE TO RELATED APPLICATION

This application is a continuation application of and claims priority to U.S. Pat. No. 9,476,512, application Ser. No. 13/602,712, filed Sep. 4, 2012, entitled ROTARY VALVE SYSTEM.

BACKGROUND OF THE INVENTION

Field of the Invention

The disclosed and claimed concept relates to forming a cup-shaped body and, more specifically, to providing a rotary valve for use in a cup ejection system.

Background Information

It is known in the container-forming art to form two-piece containers, e.g. cans, in which the walls and bottom of the container are a one-piece cup-shaped body, and the top, or end closure, is a separate piece. After the container is filled, the two pieces are joined and sealed, thereby completing the container. The cup-shaped body typically begins as a flat material, typically metal, either in sheet or coil form. Blanks, i.e., disks, are cut from the sheet stock and then drawn into a cup. That is, by moving the disk through a series of dies while disposed over a ram or punch, the disk is shaped into a cup having a bottom and a depending sidewall. The ram may have a concave end. The device structured to form the cup is identified as a "cupper." In some cuppers, after the ram and dies separate, the formed cup remains disposed over the ram until ejected therefrom, typically by a jet of air. The cup may be drawn through additional dies to reach a selected length and wall thickness. Cuppers are shown in U.S. Pat. Nos. 4,343,173; 5,628,224; and 6,014,883.

Cuppers may employ an operating mechanism having a single drive shaft coupled to multiple rams, for example, it is known to have multiple rams move essentially simultaneously. Thus, one cycle of the operating mechanism produces multiple cups. It is further known to slightly stagger the impact of the rams on the sheet material and/or dies, by positioning the rams, sheet material and/or dies at slightly different elevations. At the end of the forming cycle, the cups may remain on the end of the rams. The cups may be removed therefrom by a jet of air, or other fluid, that is passed through the ram and into the space between the cup and the concave end of the ram, as shown in U.S. Pat. No. 4,343,173.

Compressed air, or another fluid, is supplied either continuously or intermittently to the ram via a compressed gas system. Each configuration of such compressed gas systems has problems. For example, if the system is structured to provide a continuous supply of compressed gas, much of the gas is wasted. That is, during the drawing of the cup and during most of the time the ram is being retracted, the cup is not free to move from the end of the ram. Thus, gas supplied to the ram during such operations is wasted. Further, the gas must be vented and such venting may be very noisy. Alternatively, the flow of gas may be controlled by one or more valves that open only when a cup is to be ejected. Given that cuppers produce thousands of cups per hour, such valves must also open and close thousands of times an hour leading to wear and tear as well as the need to replace the valves. Further, the opening and closing of the valves requires a control system or a mechanical linkage structured to time the operation of the valve to the position of the ram. Electronic control systems are expensive and mechanical systems are subject to wear and tear.

There is, therefore, a need for a compressed gas system for a copper that uses less gas and is less noisy.

SUMMARY OF THE INVENTION

The disclosed and claimed compressed gas system provides for the use of a rotary valve assembly. A compressed gas system that utilizes a rotary valve assembly uses less gas than a constant flow compressed gas system and is quieter than a compressed gas system that uses valves. The rotary valve is a disk-like body having an opening therethrough. The rotary valve body is disposed within a housing assembly wherein gas may only flow through the housing when the rotary valve body is properly aligned with a space on one side of the rotary valve body.

BRIEF DESCRIPTION OF THE DRAWINGS

A full understanding of the invention can be gained from the following description of the preferred embodiments when read in conjunction with the accompanying drawings in which:

FIGS. 6A and 6B are front views of another embodiment of cooperative rotary valve bodies. FIG. 6C shows the combination of the cooperative rotary valve bodies shown in FIGS. 6A and 6B.

DESCRIPTION OF THE PREFERRED EMBODIMENTS

Figure 1:
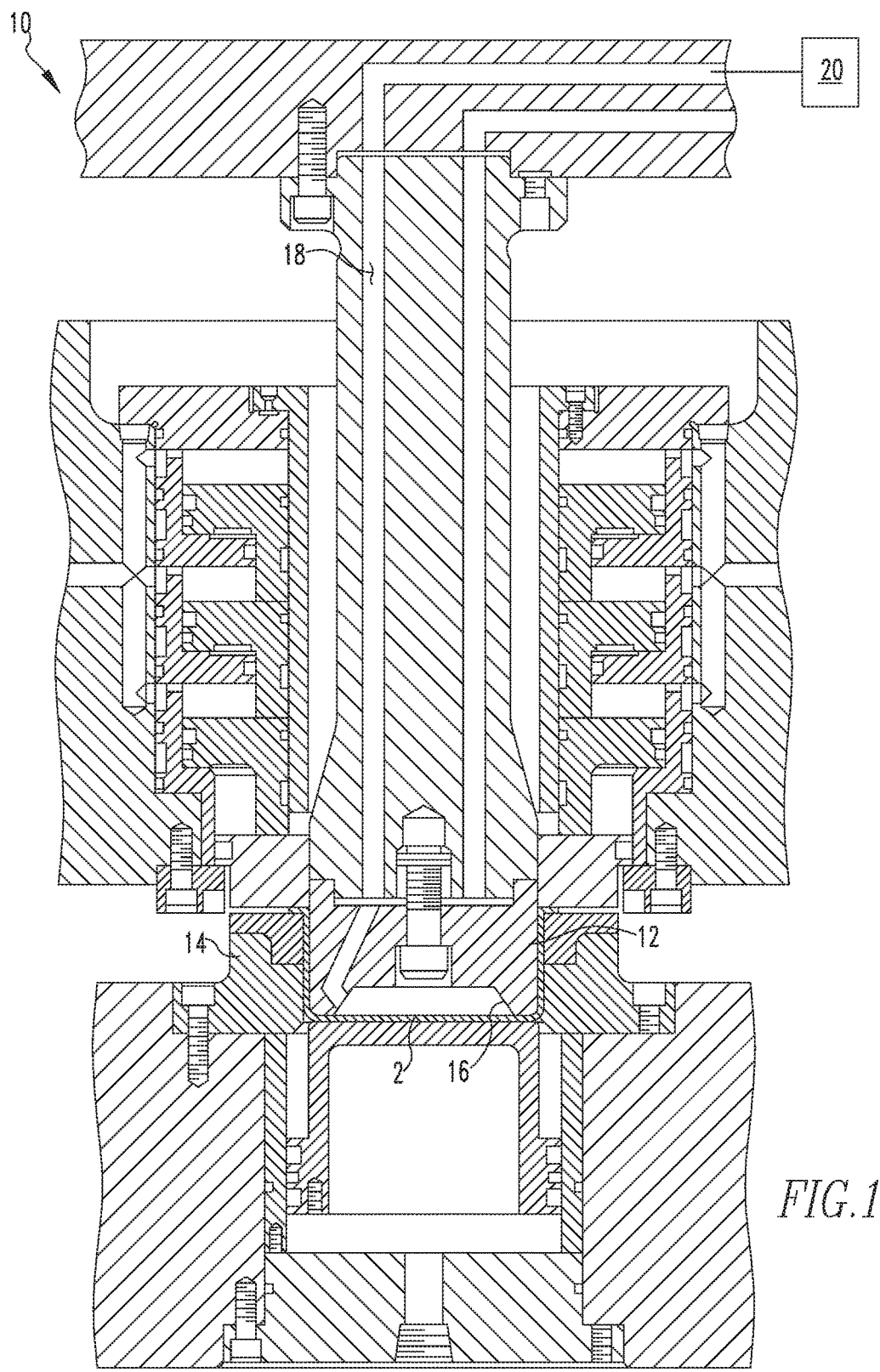
FIG. 1 is a partial cross-sectional view of a cupper.

Generally, and as shown partially in FIG. 1, a cupper 10 includes at least one movable, elongated ram 12 and a corresponding die 14. The ram 12 has a concave distal end 16 and an axial ram ejection conduit 18 that is yin fluid communication with the ram distal end 16. An operating mechanism (not shown) moves the ram 12 axially toward, and into, the die 14. A work piece (not shown), which may be a circular blank or a sheet of metal from which a circular blank is cut, is disposed between the ram 12 and the die 14. As the ram 12 moves into the die 14, the work piece is formed into a cup 2. As the ram 12 withdraws from the die 14, the cup 2 remains disposed over the end of the ram 12. The ram 12 is coupled to, and in fluid communication with, a pressurized gas system 20. The pressurized gas system 20 is structured to deliver a volume of gas to the ram distal end 16 via the axial ram ejection conduit 18. When the volume of gas is introduced at the ram distal end 16, the cup 2 will be ejected from the ram 12.

Further, it is known to operate a plurality of rams 12 with a single operating mechanism. For example, a single operating mechanism may operate multiple rams 12 at substantially the same time. It is noted that the discussion below identifies four rams 12 as an example; the disclosed concept is not limited to a specific number of rams 12. As such, multiple cups 2 will be ejected at substantially the same time. Accordingly, the pressurized gas system 20 is structured to deliver a sufficient volume of gas so as to eject a plurality of cups 2 at substantially the same time. It is noted that the plurality of rams 12 may form the cups 2 in a staggered manner. That is, the cups are formed at slightly different times so as to reduce impact forces on the operating mechanism. In such a system, the cups 2 may be ejected from the ram 12 at substantially the same time, or, the cups 2 may be ejected from the ram 12 in a staggered fashion, i.e., the cups 2 are ejected at slightly different times. For example, the cupper 10 that forms cups 2 in a staggered manner may be structured to eject all the cups 2 at a specific, single time during the cycle of the operating mechanism, or, the cups may be ejected when the ram 12 is at a certain distance from the die 14. In the former example, the cups 2 will be ejected at substantially the same time and, in the latter example, the cups 2 are ejected at slightly different times.

Figure 2:
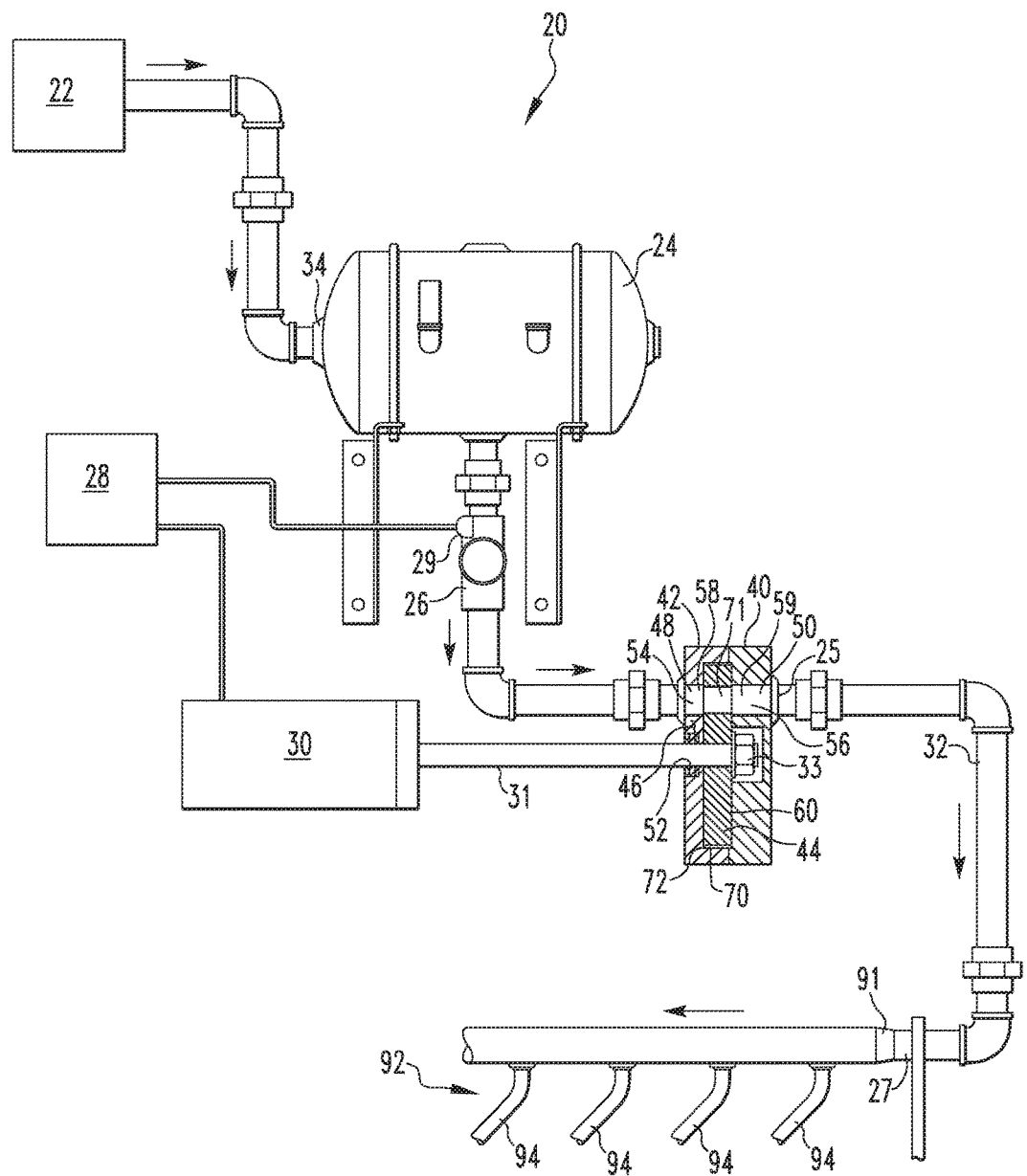
FIG. 2 is a schematic view of a pressurized gas system 20 with one embodiment of the rotary valve assembly.
Figure 7:
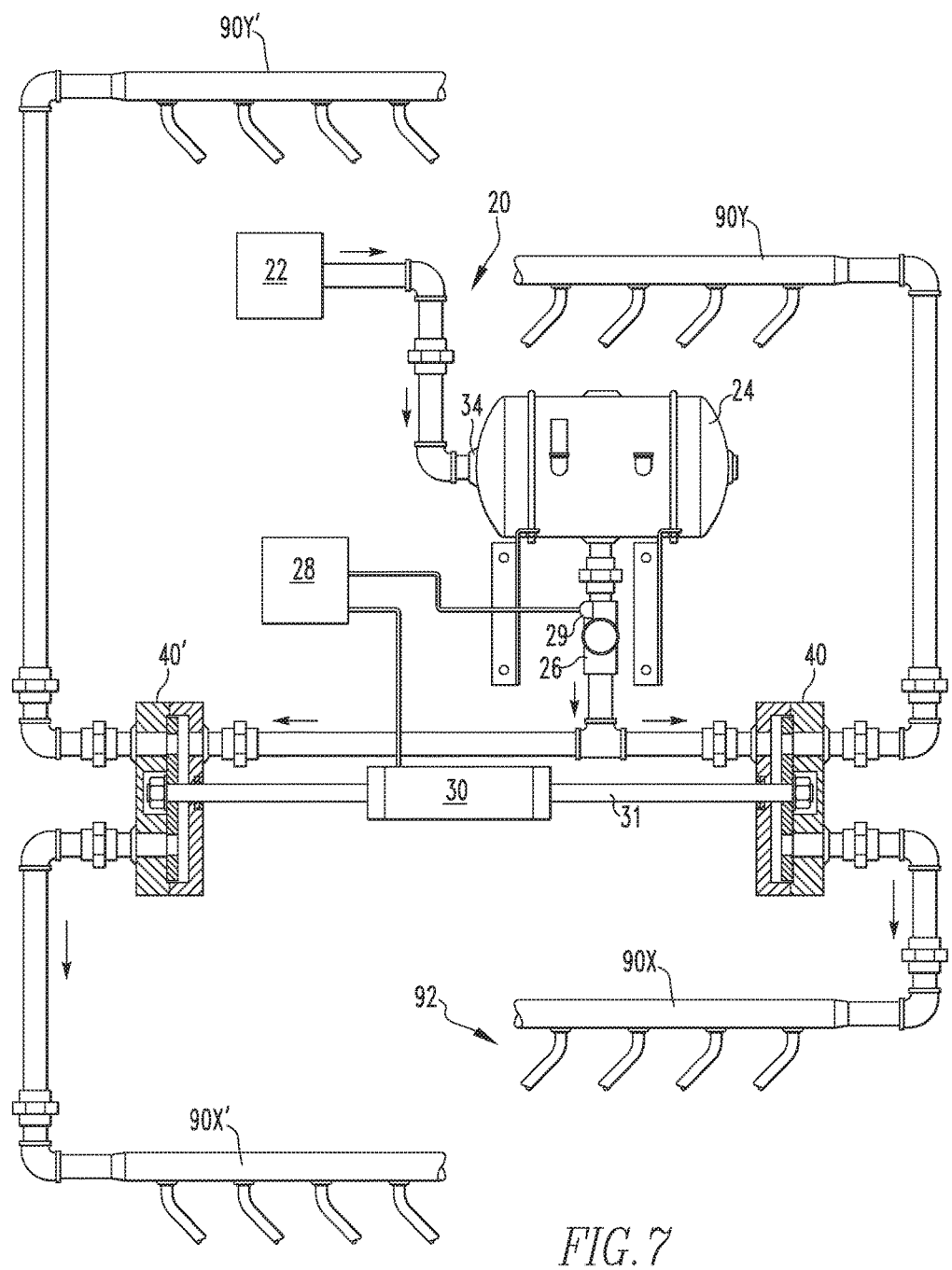
FIG. 7 is a schematic view of a pressurized gas system with another embodiment of the rotary valve assembly.
Figure 8:
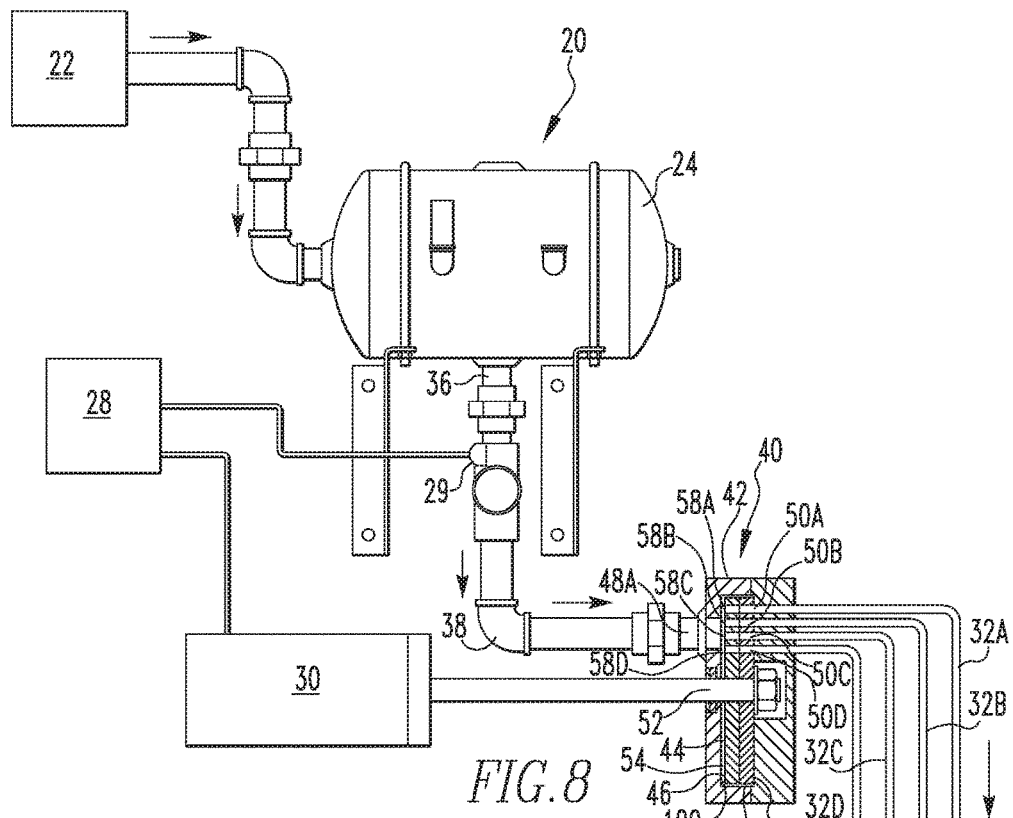
FIG. 8 is a schematic view of a pressurized gas system with another embodiment of the rotary valve assembly.
Figure 9:
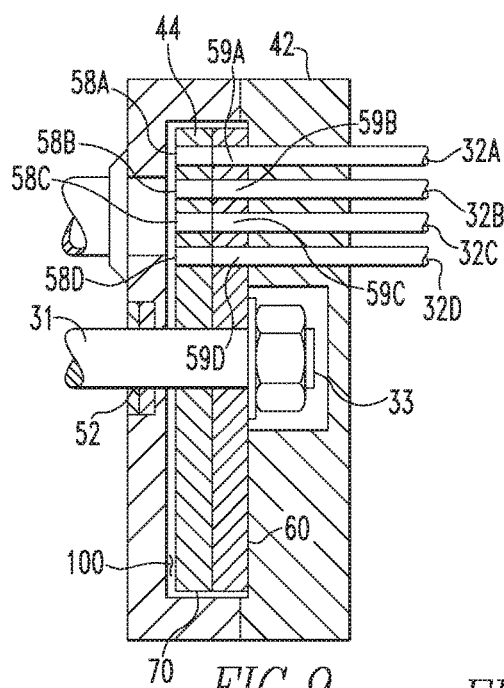
FIG. 9 is a schematic cross-sectional view of a rotary valve assembly.
Figure 10:
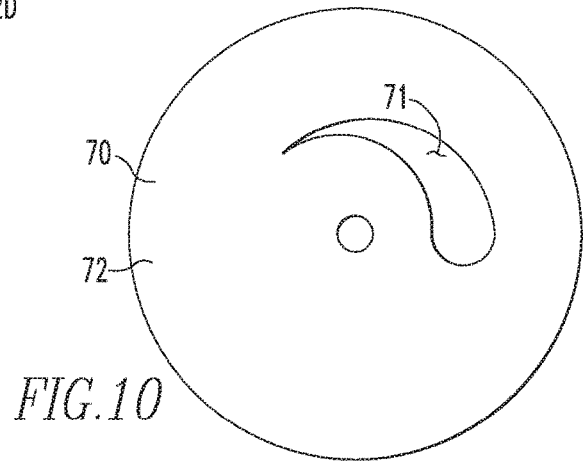
FIG. 10 is a front view of another embodiment of a rotary valve.

As shown in FIGS. 2, 7 and 8, the pressurized gas system 20 includes a source of pressurized gas 22 (shown schematically), a surge tank 24, an optional controlled valve 26, a control unit 28, a motor 30, at least one downstream pressure conduit 32 and a rotary valve assembly 40. The source of pressurized gas 22 is, in one embodiment, a compressor, but any known source for pressurized gas may be used. The surge tank 24 is structured to contain a quantity of gas at a pressure between about 10 psi and 70 psi, and in one exemplary embodiment about 18 psi. The surge tank 24 includes an inlet 34 and an outlet 36. The source of pressurized gas 22 and the surge tank 24 are coupled and in fluid communication via the surge tank inlet 34. As is known, a plurality of conduits and valves (none shown), such as but not limited to relief valves, are used to couple the source of pressurized gas 22 and the surge tank 24.

A tank conduit 38 is coupled to, and in fluid communication with, surge tank outlet 36 as well as rotary valve assembly housing assembly at least one inlet passage 48 (described below). Controlled valve 26 may be disposed anywhere on tank conduit 38. The controlled valve 26 is structured to be selectively configured. That is, the controlled valve 26 may be in a first closed configuration, a second fully open configuration, or any number of partially open configurations therebetween. The controlled valve 26 may be controlled mechanically but, in a preferred embodiment, the controlled valve 26 is structured to be selectively configured electronically. Accordingly, control unit 28 is structured to provide an electronic valve configuration command, i.e., the control unit 28 is coupled to, and in electronic communication with, the controlled valve 26. The controlled valve 26 is structured to place itself in a selected configuration in response to the electronic valve configuration command. That is, the control unit 28 is structured to configure the controlled valve 26.

The motor 30 includes at least one drive shaft 31 having a distal end 33. The motor 30 is structured to rotate the drive shaft 31 at a selected speed. In one embodiment, the drive shaft 31 rotates at between about 25 rpm and 425 rpm and in one exemplary embodiment between about 100 to 250 rpm. The speed of the motor 30 may be adjusted while in use. Thus, the motor 30 is structured to adjust its speed in response to an electronic motor command. Further, the control unit 28 is structured to provide an electronic motor command. Further, the motor may be started and stopped in selected orientations. For example, if operation of the cupper 10 is stopped, the motor 30 may be stopped with the rotary valve assembly 40 in a closed configuration, discussed below. Alternatively, if desired, the rotary valve assembly 40 may be stopped in an open configuration whereby fluid passes through the rotary valve assembly 40. The control unit 28 is coupled to, and in electronic communication with, the motor 30. Thus, the control unit 28 is structured to control the speed of the motor 30.

The control unit 28 may also include one or more sensors 29 (one shown schematically) such as, but not limited to, a pressure sensor disposed on tank conduit 38 or at least one downstream pressure conduit 32. The sensors 29 are in electronic communication with the control unit 28 and provide data thereto. The control unit 28 may also include a processor, memory, and programming (none shown) structured to automatically adjust the configuration of the controlled valve 26 and the speed of motor 30 in response to the sensor 29 data.

Rotary valve assembly 40 includes a housing assembly 42 and a rotary valve 44. The rotary valve assembly housing assembly 42 defines an enclosed space 46 and has at least one inlet passage 48, at least one outlet passage 50, and a drive shaft passage 52. Each of the inlet passage (s) 48, outlet passage(s) 50, and drive shaft passage 52 are in fluid communication with said enclosed space 46. The rotary valve 44 is disposed in the enclosed space 46 and effectively divides the enclosed space 46 into an upstream enclosed space 54 and a downstream enclosed space 56. As described below, the rotary valve 44 includes a rotary valve body assembly 70 (discussed below) with at least one opening 71. The rotary valve at least one opening 71 is structured to allow selective passage of a gas from the upstream enclosed space 54 to the downstream enclosed space 56. That is, the rotary valve at least one axial opening 71 is only in fluid communication with both the upstream enclosed space 54 and the downstream enclosed space 56 intermittently. To accomplish this, the rotary valve at least one opening 71 is intermittently in fluid communication with at least one aligned portion 58 of the upstream enclosed space 54 and at least one aligned portion 59 the downstream enclosed space 56. As used herein, the at least one "aligned portion 58" of the upstream enclosed space 54 and the downstream enclosed space 56 means the portion of the enclosed space 46 wherein an upstream enclosed space 54 and a downstream enclosed space 56 exist on each side of the rotary valve 44 in a direction generally parallel to the axis of rotation of the rotary valve 44. That is, to prevent constant fluid communication through the rotary valve 44, the enclosed space 46 includes a substantially sealed portion 60 wherein the rotary valve assembly housing assembly 42 is very close, and may abut, at least one side of the rotary valve body assembly 70. As there is no space between the rotary valve 44 and the rotary valve assembly housing assembly 42 in the substantially sealed portion 60, there is no enclosed space 54, 56 to be an "aligned portion 58" of the upstream enclosed space 54 or the downstream enclosed space 56.

In the enclosed space substantially sealed portion 60 the nearness of the rotary valve assembly housing assembly 42 to the rotary valve body assembly 70 substantially prevents fluid from passing through the rotary valve at least one opening 71. A discussion of various embodiments of the rotary valve assembly housing assembly 42 with different embodiments of the enclosed space 46 follow the discussion of the rotary valve 44.

Figure 3:
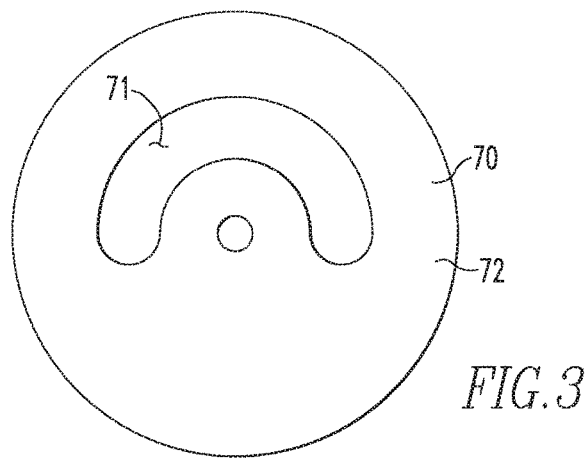
FIG. 3 is a front view of one embodiment of a rotary valve.

As shown in FIG. 3, the rotary valve 44 includes a substantially disk shaped body assembly 70 having at least one axial opening 71 therethrough. As used herein, "disk shaped" may include an axially elongated disk or cylinder. Further, as used herein, "axial opening" means the opening 71 extends parallel to the axis of the disk shaped body assembly 70 and does not mean that the opening is disposed on the axis of the disk shaped body assembly 70. In one embodiment, the rotary valve body assembly 70 is a substantially circular, planar body 72 having an opening 71 therethrough. The rotary valve body assembly opening 71 may be any shape, but is, as shown, preferably arcuate. Further, as shown, the rotary valve body assembly opening 71 extends over an arc of about 180 degrees; it is understood that the rotary valve body assembly opening 71 may extend over a longer or shorter arc as needed.

Figure 4A:
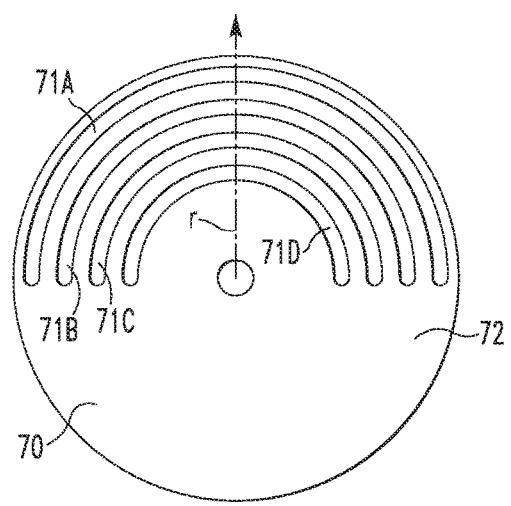
FIG. 4A is a front view of another embodiment of a rotary valve.
Figure 4B:
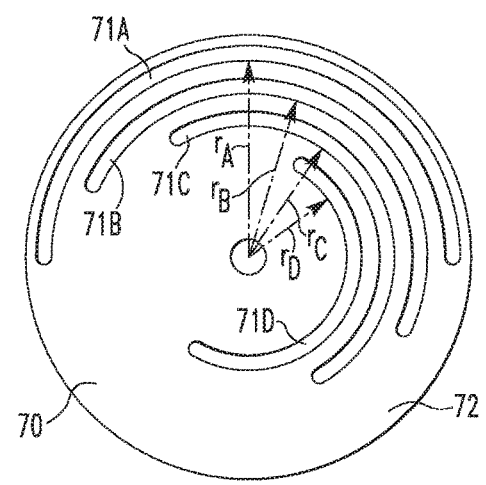
FIG. 4B is a front view of another embodiment of a rotary valve.

In another embodiment, shown in FIG. 4A, the rotary valve body assembly 70 is, again, a substantially circular, planar body 72 having a plurality of openings 71A, 71B, 71C, 71D therethrough. Each rotary valve body assembly opening 71A, 71B, 71C, 71D is disposed at a different radial distance from the center of the rotary valve body assembly body 72. The center-point of the rotary valve body assembly openings 71A, 71B, 71C, 71D, i.e., not the mathematical "center" of the arcs which is the center of the rotary valve body assembly body 72, may be disposed substantially on a single radius, i.e., along a single radial line r, as shown in FIG. 4A. In an alternate embodiment, shown in FIG. 4B, the rotary valve body assembly openings 71A, 71B, 71C, 71D may be staggered. That is, the center-point of each rotary valve body assembly openings 71A, 71B, 71C, 71D is disposed on a different radial line $R_A$, $R_B$, $R_C$, $R_D$. It is noted that FIGS. 4A and 4B each disclose four rotary valve body assembly openings 71A, 71B, 71C, 71D and such a rotary valve body assembly 70 could be used, with a cupper having four rams 12. It is again noted, however, that the disclosed concept is not limited to a cupper 10 having a specific number of rams 12. It is understood that if the cupper 10 has a different number of rams 12 the rotary valve body assembly 70, or multiple rotary valve body assemblies 70, will have a corresponding number of rotary valve body assembly openings 71.

Figure 5A:
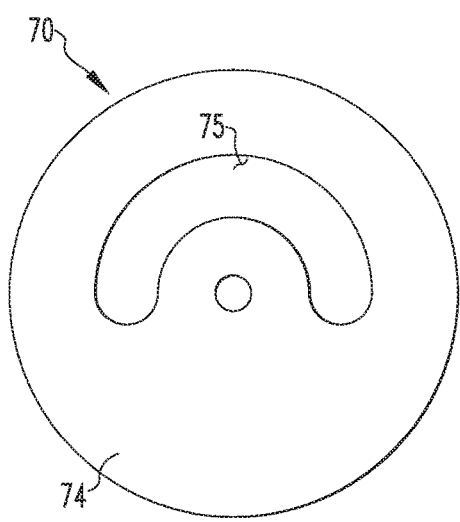
FIGS. 5A and 5B are front views of another embodiment of a rotary valve.
Figure 5B:
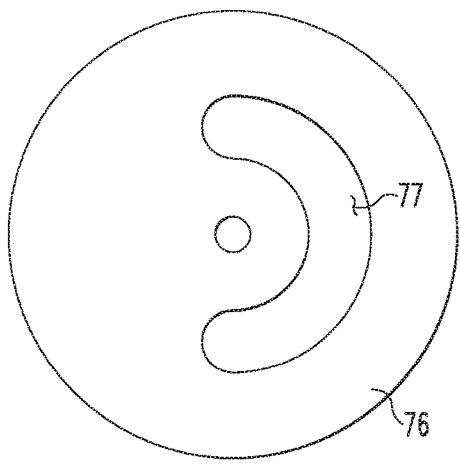
Figure 5C:
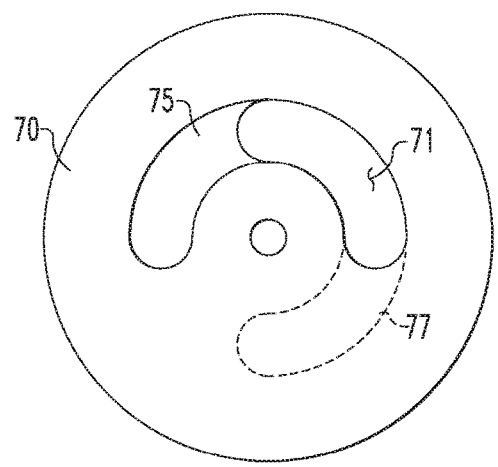
FIG. 5C shows the combination of the cooperative rotary valve bodies shown in FIGS. 5A and 5B.

In another embodiment, shown in FIGS. 5A and 5B the rotary valve body assembly 70 includes two substantially circular, planar bodies 74, 76 that are, preferably, about the same size and may be placed in alignment as indicated in FIG. 5A. Each rotary valve body assembly planar body 74, 76 has at least one axial opening 75, 77, respectively, therethrough. Each rotary valve body assembly first and second planar body at least one axial opening 75, 77 is disposed at a similar radius so as to at least partially overlap when the rotary valve body assembly first and second planar bodies 74, 76 are disposed on a common axis and the rotary valve body assembly first and second planar body at least one axial opening 75, 77 are at least partially aligned, as shown in FIG. 5B. Preferably, the rotary valve body assembly first and second planar bodies 74, 76 are disposed on drive shaft distal end 33. In this configuration, the rotary valve body assembly first planar body at least one axial opening 75 may move relative to said rotary valve body assembly second planar body at least one axial opening 77 between a first position, wherein the rotary valve body assembly first and second planar body at least one axial openings 75, 77 are substantially aligned, and a second position wherein the rotary valve body assembly first and second planar body at least one axial openings 75, 77 are partially aligned.

Further, the two rotary valve body assembly bodies 74, 76 substantially abut each other. That is, the two rotary valve body assembly bodies 74, 76 contact each other over one axial face so that there is, essentially, no gap therebetween. A localized gap may exist if the abutting axial faces of the two rotary valve body assembly bodies 74, 76 are not perfectly smooth, but such a gap does not form a path for fluid communication from one side of the rotary valve body assembly 70 to the other. The rotary valve body assembly openings 75, 77 are, preferably, arcuate and extend over an arc of about 180 degrees. In this configuration, the two rotary valve body assembly bodies 74, 76 may be rotated relative to each other so as to adjust the size of the rotary valve at least one axial opening 71. That is, if the two rotary valve body assembly bodies 74, 76 are positioned so that the rotary valve body assembly openings 75, 77 are substantially aligned, the rotary valve at least one axial opening 71 will extend over an arc of about 180 degrees. If, the two rotary valve body assembly bodies 74, 76 are positioned so that the rotary valve body assembly openings 75, 77 are 50% aligned, as shown, the rotary valve at least one axial opening 71 will extend over an arc of about 90 degrees. Thus, by selectively positioning the two rotary valve body assembly bodies 74, 76 relative to each other, the size of the rotary valve at least one axial opening 71 may be adjusted.

In another embodiment shown in FIGS. 6A and 6B, and as with the embodiment wherein the rotary valve body assembly 70 includes a single circular, planar body 72, the rotary valve body assembly 70 having two substantially circular, planar bodies 74, 76 may also include a plurality of rotary valve body assembly openings 75A, 77A, 75B, 77B, 75C, 77C, 75D, 77D, respectively. The rotary valve body assembly openings 75A, 77A, 75B, 77B, 75C, 77C, 75D, 77D on each of the two rotary valve body assembly bodies 74, 76 are each disposed at a different radial distance from the center of the associated rotary valve body assembly body 74, 76. The rotary valve body assembly openings 75A, 77A, 75B, 77B, 75C, 77C, 75D, 77D on different rotary valve body assembly bodies 74, 76, however, are at substantially the same radial distance from the center of the associated rotary valve body assembly body 74, 76. That is, for example, rotary valve body assembly openings 75A, 77A are each at substantially the same radial distance from the center of the associated rotary valve body assembly body 74, 76. In this configuration, each pair of the rotary valve body assembly openings at substantially the same radial distance, e.g., rotary valve body assembly openings 75A, 77A, may be aligned to create a rotary valve axial opening 71A, as shown in FIG. 6B. Further, the rotary valve body assembly openings 75A, 77A, 75B, 77B, 75C, 77C, 75D, 77D are, preferably, arcuate so that the size of the rotary valve axial openings 71A, 71B, 71C, 71D may be adjusted as described above.

Figure 6D:
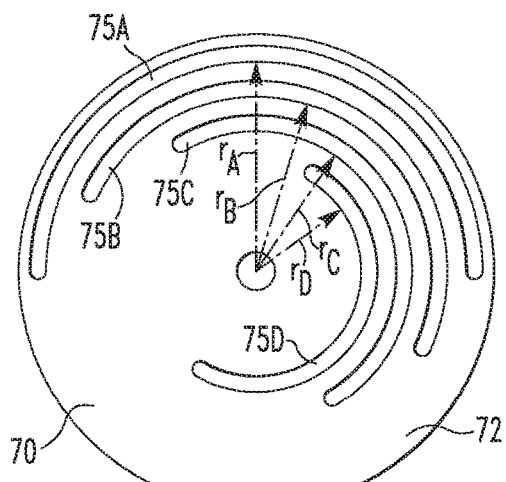
FIGS. 6D and 6E are front views of another embodiment of cooperative rotary valve bodies.
Figure 6E:
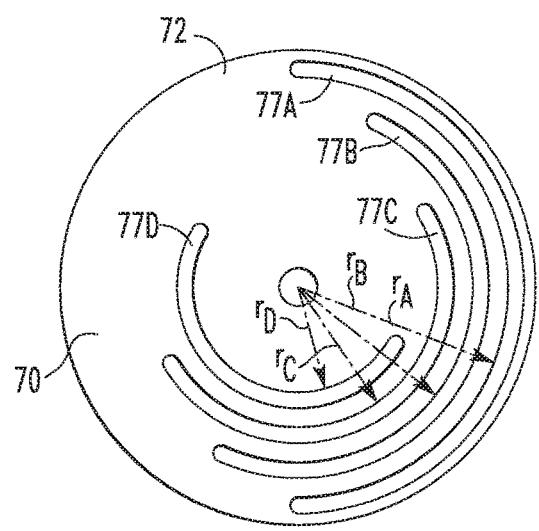
Figure 6F:
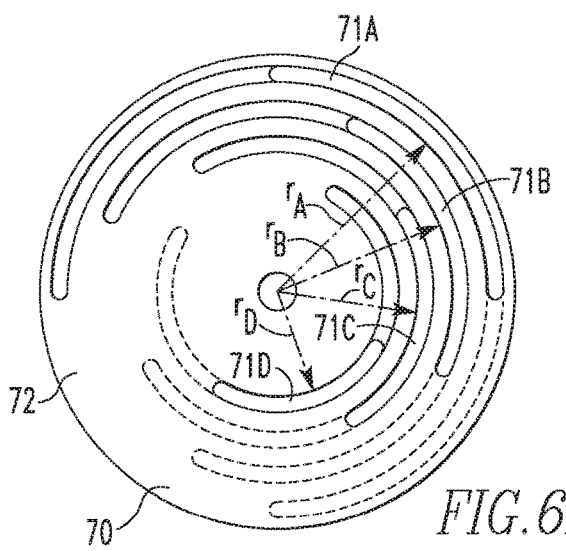
FIG. 6F shows the combination of the cooperative rotary valve bodies shown in FIGS. 6D and 6E.

Also, as with the embodiment wherein the rotary valve body assembly 70 includes a single circular, planar body 72, the rotary valve body assembly openings 75A, 77A, 75B, 77B, 75C, 77C, 75D, 77D may be positioned on the rotary valve body assembly body 74, 76 so that the center-point of the resulting rotary valve axial openings 71A, 71B, 71C, 71D may be disposed substantially on a single radius, i.e., along a single radial line, or, may be staggered, i.e., disposed along different radial lines. Alternatively, as shown in FIGS. 6D-6F, the rotary valve body assembly openings 75A, 77A, 75B, 77B, 75C, 77C, 75D, 77D may be staggered. In this configuration, when rotary valve body assembly body 74, 76 are joined the center-point of each rotary valve body assembly openings 71A, 71B, 71C, 71D is disposed on a different radial line $R_A, R_B, R_C, R_D$. It is noted that FIGS. 6A-6F each disclose four rotary valve body assembly openings 71A, 71B, 71C, 71D and such a rotary valve body assembly 70 could be used with a cupper having four rams 12. It is again noted, however, that the disclosed concept is not limited to a cupper 10 having a specific number of rams 12. It is understood that if the cupper 10 has a different number of rams 12, the rotary valve body assembly 70, or multiple rotary valve body assemblies 70, will have a corresponding number of rotary valve body assembly openings 71.

It is further noted that the rotary valve at least one axial opening 71 maybe shaped so as to produce a specific pressure profile through the rotary valve assembly 40. For example, an arcuate rotary valve at least one axial opening 71 may have a narrow radial width at the beginning of the arcuate rotary valve at least one axial opening 71, and a wider radial width at the end of the arcuate rotary valve at least one axial opening 71. That is, the at least one axial opening 71 may be shaped as an arcuate "teardrop." Other shapes for the at least one axial opening 71 may be used as well. As used herein, a "shaped" axial opening 71 is an axial opening 71 wherein the opposing edges of the opening are not substantially parallel.

The rotary valve 44, i.e., the rotary valve body assembly 70, is coupled to the drive shaft distal end 33. It is noted that a single motor 30 may be used to drive more than one rotary valve 44. For example, a single drive shaft 31 may be coupled to more than one rotary valve assembly 40. In such a configuration, the "drive shaft distal end 33" shall mean any part of the drive shaft 31 that is spaced from the motor 30. Alternatively, as shown in FIG. 7, the motor 30 may include more than one drive shaft 31, 31', each of which is coupled to a rotary valve assembly 40.

The at least one downstream pressure conduit 32 has an inlet 25 and an outlet 27 is coupled to, and in fluid communication with, the rotary valve assembly housing assembly at least one outlet passage 50. The at least one downstream pressure conduit 32 is also coupled to, and in fluid communication with, the axial ram ejection conduit 18. In a cupper 10 with a single ram 12, the at least one downstream pressure conduit 32 may be a single downstream pressure conduit 32. As shown in FIG. 2, in a cupper with a plurality of rams 12, the at least one downstream pressure conduit 32 may include, and be in fluid communication with, a manifold 90 having a manifold inlet 91 and a plurality of manifold outlet conduits 92 each coupled to, and in fluid communication with, one of the rams 12 in the plurality of rams 12. Alternatively, in a cupper 10 with a plurality of rams 12, the at least one downstream pressure conduit 32 may include a plurality of downstream pressure conduits 32A, 32B, 32C, 32D each coupled to, and in fluid communication with, one of the rams 12 in the plurality of rams 12. It is noted that, for this example, it is assumed that there are four rams 12 in the plurality of rams 12. If there are more than four rams 12, there is a downstream pressure conduit 32N for each ram 12. Further, the pressurized gas system 20 may be structured to operate with more than one plurality of rams 12. That is, the cupper 10 may have a first plurality of rams 12 operating on a first cycle and a second plurality of rams 12 operating on a second cycle. In this configuration, the at least one downstream pressure conduit 32 may include two downstream pressure conduits 32X, 32Y each coupled to a manifold 90X, 90Y, as shown in FIG. 7, each having a plurality of manifold conduits 92 each coupled to, and in fluid communication with, one of the rams 12 in both plurality of rams 12. Further, the at least one downstream pressure conduit 32 may include an individual conduit 32N coupled to, and in fluid communication with, each ram 12 in both plurality of rams 12. Further, as shown in FIG. 7, if the motor 30 includes more than one drive shaft 31, 31', as discussed above, each drive shaft 31, 31' is coupled to a rotary valve assembly 40, 40' each of which is in fluid communication with one or more manifolds 90X, 90Y, 90X', 90Y'. It is noted that the rotary valve 44 in each rotary valve assembly 40, 40' may be radially offset relative to each other. That is, the rotary valve assemblies 40, 40' may be structured to be open at different times.

Generally, when assembled, the drive shaft distal end 33 extends through the rotary valve assembly housing assembly drive shaft passage 52. The rotary valve 44, i.e., the rotary valve body assembly 70, is coupled to the drive shaft distal end 33 within the rotary valve assembly housing assembly enclosed space 46, thereby dividing the rotary valve assembly housing assembly enclosed space 46 into the upstream enclosed space 54 and a downstream enclosed space 56 described above. A discussion of the "aligned portion" of the upstream enclosed space 54 and the downstream enclosed space 56 may be more easily understood by providing examples. Accordingly, and as shown in FIG. 2, in one embodiment, the rotary valve assembly housing assembly at least one inlet passage 48 and at least one outlet passage 50 are each a single passage 48A, 50A, respectively. Further, the rotary valve assembly housing assembly inlet passage 48A and outlet passage 50A are coextensive with the upstream enclosed space 54 and the downstream enclosed space 56, respectively. Further, the rotary valve assembly housing assembly inlet passage 48A and outlet passage 50A are substantially aligned. Thus, the rotary valve assembly housing assembly inlet passage 48A and outlet passage 50A are the at least one "aligned portion" of the upstream enclosed space 54 and the downstream enclosed space 56. Other than the portions of the rotary valve assembly housing assembly 42 that accommodate the drive shaft distal end 33, the remaining portions of the rotary valve assembly housing assembly enclosed space 46 are disposed very close, and may abut, both sides of the rotary valve body assembly 70. That is, other than the space defined by the rotary valve assembly housing assembly inlet passage 48A and outlet passage 50A, the rotary valve assembly housing assembly enclosed space 46 is a substantially sealed portion 60. Thus, the rotation of the rotary valve body selectively provides fluid communication between aligned portions of the upstream enclosed space 54 and the downstream enclosed space 56 via the rotary valve body assembly at least one opening 71 when the rotary valve at least one axial opening 71 is in fluid communication with the at least one aligned portion 58 of the upstream enclosed space 54 and the downstream enclosed space 56.

This embodiment operates as follows. Pressurized gas from the surge tank 24 is communicated via the tank conduit 38 to the rotary valve assembly housing assembly at least one inlet passage 48. When the rotary valve at least one axial opening 71 is disposed within the rotary valve assembly housing assembly substantially sealed portion 60, there is no passage for fluid communication through the rotary valve assembly 40. In this configuration the rotary valve assembly 40 is "closed." As the drive shaft 31 rotates, the rotary valve at least one axial opening 71 is brought into alignment with the rotary valve assembly housing assembly inlet passage 48A and outlet passage 50A, i.e. into alignment with the aligned portions of the upstream enclosed space 54 and the downstream enclosed space 56. In this configuration the rotary valve assembly 40 is "open." That is, when the rotary valve at least one axial opening 71 is brought into alignment with the rotary valve assembly housing assembly inlet passage 48A and outlet passage 50A gas may pass through the rotary valve assembly 40. Thus, the gas is communicated to the at least one downstream pressure conduit 32 and then to the axial ram ejection conduit 18 whereby a cup 2 is ejected from the ram 12. As the rotary valve at least one axial opening 71 is moved out of alignment with the rotary valve assembly housing assembly inlet passage 48A and outlet passage 50A, gas does not pass through the rotary valve assembly 40. During this time, the ram 12 is actuated to form another cup.

In another embodiment, shown in FIG. 8, the rotary valve assembly housing assembly 42 includes a space 100 on one side of the rotary valve 44. For this example, it will be assumed that the rotary valve assembly housing assembly space 100 is disposed on the upstream side of the rotary valve body assembly 70. That is, in this embodiment, the rotary valve assembly housing assembly 42 may be spaced from the upstream side of the rotary valve body assembly 70. Rotary valve assembly housing assembly at least one inlet passage 48 is in fluid communication with the rotary valve assembly housing assembly space 100. Thus, the upstream enclosed space 54 extends over the entire upstream side of the rotary valve 44 and is coextensive with space 100. Similar to the embodiment described above, the rotary valve assembly housing assembly 42 on the downstream side of the rotary valve body assembly 70 includes an outlet passage 50A and a portion disposed very close to, and which may abut, the downstream side of the rotary valve body assembly 70, i.e., the substantially sealed portion 60. Thus, the portion of the upstream enclosed space 54 on the opposite side of the rotary valve body assembly 70 from the outlet passage 50A is the at least one aligned portion 58 of the upstream enclosed space 54 and the downstream enclosed space 56.

This embodiment operates as follows. Pressurized gas from the surge tank 24 is communicated via the tank conduit 38 to the rotary valve assembly housing assembly at least one inlet passage 48 and into rotary valve assembly housing assembly space 100. When the rotary valve at least one axial opening 71 is disposed within the rotary valve assembly housing assembly substantially sealed portion 60, there is no passage for fluid communication through the rotary valve assembly 40. As the drive shaft 31 rotates, the rotary valve at least one axial opening 71 is brought into alignment with the rotary valve assembly housing assembly outlet passage 50A, i.e., into alignment with the aligned portion 58 of the upstream enclosed space 54 and the downstream enclosed space 56. When the rotary valve at least one axial opening 71 is brought into alignment with the rotary valve assembly housing assembly outlet passage 50A gas may pass through the rotary valve assembly 40. Thus, the gas is communicated to the at least one downstream pressure conduit 32 and then to the axial ram ejection conduit 18 whereby a cup 2 is ejected from the ram 12. As the rotary valve at least one axial opening 71 is moved out of alignment with the rotary valve assembly housing assembly outlet passage 50A, gas does not pass through the rotary valve assembly 40. During this time, the ram 12 is actuated to form another cup.

It is noted that the configuration described above may be reversed, i.e., the rotary valve assembly housing assembly space 100 may be disposed on the downstream side of the rotary valve body assembly 70.

Cupper 10 may include multiple rams 12 acting in cooperation, i.e., utilizing one drive mechanism. Either embodiment described above may be configured to operate with a manifold 90, also described above. In an exemplary embodiment having four rams, the at least one downstream pressure conduit 32 may include a manifold 90 having four outlet conduits 94, wherein each manifold outlet conduit 94 is in fluid communication with one of the four rams 12. Thus, rather than ejecting a single cup 2 from a single ram 12, four cups 2 are ejected from four rams 12 simultaneously. It is understood that in an embodiment having more than four rams 12, the manifold 90 has more than four outlet conduits 94, i.e., one outlet conduit 94 for each ram. Alternatively, there may be more than one manifold 90 as shown in FIG. 7 and discussed above.

The embodiment, shown in FIG. 8, is also structured to eject four cups 2 from four rams 12, but without using a manifold 90. In this embodiment, the housing assembly at least one outlet passage 50 includes four housing assembly outlet passages 50A, 50B, 50C, 50D. Each housing assembly outlet passage 50A, 50B, 50C, 50D is coupled to and in fluid communication with one of the four rams 12. That is, there are also four downstream pressure conduits 32A, 32B, 32C, 32D, each coupled to and extending between each housing assembly outlet passage 50A, 50B, 50C, 50D and one of the four rams 12. Moreover, each housing assembly outlet passage 50A, 50B, 50C, 50D is separate from each other. There may also be housing assembly four inlet passages 48 (not shown), but as shown, there is one housing assembly four inlet passage 48 and a space 100 on one side of the upstream side of the rotary valve 44. In this configuration, there are four aligned portions 58A, 58B, 58C, 58D of the upstream enclosed space 54 and the four aligned portions 59A, 59B, 59C, 59D downstream enclosed space 56. Further, there are four each of the rotary valve body assembly at least one axial openings 71A, 71B, 71C, 71D. Each of the four rotary valve body assembly axial openings 71A, 71B, 71C, 71D is structured to provide selective fluid communication between the upstream enclosed space 54 and one of the four housing assembly outlet passage 50A, 50B, 50C, 50D. Although axial openings 71A, 71B, 71C, 71D are shown in the figures as having a similar width, the axial openings 71A, 71B, 71C, 71D would typically be thinner near the perimeter of rotary valve body assembly 70 and thicker near the center of rotary valve body assembly 70. By selecting the thickness of the axial openings 71A, 71B, 71C, 71D, the volume of fluid passing through each axial opening 71A, 71B, 71C, 71D may be balanced.

In this configuration, pressurized gas from the surge tank 24 is communicated via the tank conduit 38 to the rotary valve assembly housing assembly at least one inlet passage 48 and into rotary valve assembly housing assembly space 100. When each rotary valve at least one axial opening 71A, 71B, 71C, 71D is disposed within the rotary valve assembly housing assembly substantially sealed portion 60, there is no passage for fluid communication through the rotary valve assembly 40. As the drive shaft 31 rotates, each rotary valve at least one axial opening 71A, 71B, 71C, 71D is brought into alignment with one rotary valve assembly housing assembly outlet passage 50A, 50B, 50C, 50D, i.e., into alignment with the aligned portion 58 of the upstream enclosed space 54 and the downstream enclosed space 56. When the rotary valve at least one axial opening 71 is brought into alignment with the rotary valve assembly housing assembly outlet passage 50A, 50B, 50C, 50D, gas may pass through the rotary valve assembly 40. Thus, the gas is communicated to the each downstream pressure conduits 32A, 32B, 32C, 32D and then to one of the four the axial ram ejection conduits 18 whereby a cup 2 is ejected from each ram 12. As the rotary valve axial openings 71A, 71B, 71C, 71D are moved out of alignment with the rotary valve assembly housing assembly outlet passages 50A, 50B, 50C, 50D, gas does not pass through the rotary valve assembly 40.

Further, this embodiment may be structured to allow for the ejection of the cups to be staggered. That is, the four rotary valve axial openings 71A, 71B, 71C, 71D may be disposed in a staggered configuration, i.e., disposed along different radial lines, as described above. In this configuration, and assuming the rotary valve assembly housing assembly outlet passages 50A, 50B, 50C, 50D are disposed along a single radial line, each rotary valve axial opening 71A, 71B, 71C, 71D enters the four aligned portions 58A, 58B, 58C, 58D of the upstream enclosed space 54 and the downstream enclosed space 56 at a slightly different time, thus providing for the gas to pass through the rotary valve 44 at slightly different times. This, in turn, causes the ejection of the cups 2 to be slightly staggered. Alternatively, the four rotary valve axial openings 71A, 71B, 71C, 71D may be disposed along the same radial line and the rotary valve assembly housing assembly outlet passages 50A, 50B, 50C, SOD may be disposed along different radial lines. This means that the four aligned portions 58A, 58B, 58C, 58D of the upstream enclosed space 54 and the downstream enclosed space 56 are staggered and that the four rotary valve axial openings 71A, 71B, 71C, 71D will enter the four aligned portions 58A, 58B, 58C, 58D of the upstream enclosed space 54 and the downstream enclosed space 56 at slightly different times. The end result is the same; the gas passes through the rotary valve 44 at slightly different times and this, in turn, causes the ejection of the cups 2 to be slightly staggered.

In the examples above, it was assumed that there were four rams 12 operating on the cupper 10. There may, however, be any number of rains 12 on the cupper 10. Thus, in an embodiment without a manifold 90 as part of the at least one downstream pressure conduit 32, there is at least one downstream pressure conduit 32 per ram 12. That is, in such an embodiment the number of relevant components correspond to the number of rams 12 on the cupper 10. Thus, the housing assembly at least one outlet passage 50 includes a plurality of housing assembly outlet passages 50, the number of housing assembly outlet passages 50 correspond to the number of the downstream pressure conduits 32. Further, each housing assembly outlet passage 50 is coupled to, and in fluid communication with, one of the downstream pressure conduits 32. Further, the rotary valve body assembly at least one axial opening 71 includes a plurality of axial openings 71, the number of axial openings also corresponding to the number of downstream pressure conduits 32. Thus, each rotary valve body assembly axial opening 71 is structured to provide selective fluid communication between the upstream enclosed space 56 and one of the housing assembly outlet passages 50.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A pressurized gas system for a cupper, said cupper having at least one ram and at least one die structured to form a metal blank into a cup, wherein, after forming, the cup is disposed over the distal end of said at least one ram, said at least one ram having an ejection conduit extending therethrough, said ram ejection conduit having an inlet, said pressurized gas system comprising:
    a surge tank structured to contain a pressurized gas, said surge tank having an outlet;
    a motor having at least one drive shaft;
    a rotary valve assembly having a housing assembly and a rotary valve body assembly, said housing assembly having at least one inlet passage, at least one outlet passage, said rotary valve assembly at least one inlet passage coupled to, and in fluid communication with, said surge tank having an outlet, said rotary valve body assembly disposed within said housing assembly and coupled to said motor, wherein said rotary valve body assembly is structured to selectively provide fluid communication therethrough;
    at least one downstream pressure conduit, each downstream pressure conduit having an inlet and an outlet, said at least one downstream pressure conduit inlet coupled to, and in fluid communication with, said rotary valve assembly at least one outlet passage, said at least one downstream pressure conduit outlet coupled to, and in fluid communication with, at least one ram ejection conduit;
    a controlled valve and a control unit;
    said controlled valve coupled to, and in fluid communication with, said surge tank outlet and said rotary valve assembly at least one inlet passage, said controlled valve structured to be selectively configured electronically;
    said control unit structured to provide an electronic valve configuration command, said control unit coupled to, and in electronic communication with, said controlled valve; and
    whereby said control unit is structured to configure said controlled valve.

2. The pressurized gas system of claim 1 wherein:
    said control unit structured to provide an electronic motor command;
    said rotary valve assembly motor structured to adjust its speed in response to an electronic motor command;
    said control unit coupled to, and in electronic communication with, rotary valve assembly motor; and
    whereby said control unit is structured to control the speed of said rotary valve assembly motor.

3. The pressurized gas system of claim 2 wherein said motor includes two drive shafts, each drive shaft coupled to a rotary valve assembly.

4. A pressurized gas system for a cupper, said cupper having at least one ram and at least one die structured to form a metal blank into a cup, wherein, after forming, the cup is disposed over the distal end of said at least one ram, said at least one ram having an ejection conduit extending therethrough, said ram election conduit having an inlet, said pressurized gas system comprising:
    a surge tank structured to contain a pressurized gas, said surge tank having an outlet;
    a motor having at least one drive shaft;

a rotary valve assembly having a housing assembly and a rotary valve body assembly, said housing assembly having at least one inlet passage, at least one outlet passage said rotary valve assembly at least one inlet passage coupled to, and in fluid communication with, said surge tank having an outlet, said rotary valve body assembly disposed within said housing assembly and coupled to said motor, wherein said rotary valve body assembly is structured to selectively provide fluid communication therethrough;

at least one downstream pressure conduit, each downstream pressure conduit having an inlet and an outlet, said at least one downstream pressure conduit inlet coupled to, and in fluid communication with, said rotary valve assembly at least one outlet passage, said at least one downstream pressure conduit outlet coupled to, and in fluid communication with, at least one ram ejection conduit;

said rotary valve body assembly includes a first planar body and a second planar body;

each of said rotary valve body assembly first and second planar bodies having at least one axial opening therethrough, each said rotary valve body assembly first and second planar body at least one axial opening being disposed at a radius so as to at least partially overlap when said rotary valve body assembly first and second planar bodies are disposed on a common axis;

said rotary valve body assembly first and second planar bodies being rotatable disposed on a common axis; and wherein said rotary valve body assembly first planar body at least one axial opening may move relative to said rotary valve body assembly second planar body at least one axial opening between a first position, wherein said rotary valve body assembly first and second planar body at least one axial openings are substantially aligned, and a second position wherein said rotary valve body assembly first and second planar body at least one axial openings are partially aligned.

5. The pressurized gas system of claim 4 wherein said rotary valve body assembly first and second planar body at least one axial openings are arcuate openings.

6. The pressurized gas system of claim 4 wherein there is one each of said rotary valve body assembly first and second planar body at least one axial openings.

7. The pressurized gas system of claim 4 wherein said multiple rotary valve body assembly axial openings are radially staggered about said rotary valve body.

8. The pressurized gas system of claim 4 wherein said at least one ram and at least one die includes multiple rams and multiple dies acting in cooperation, and wherein:

said housing assembly at least one outlet passage includes multiple housing assembly outlet passages, each housing assembly outlet passage coupled to and in fluid communication with one of said multiple rams;

wherein there is multiple each of said rotary valve body assembly at least one axial openings;

each of said multiple rotary valve body assembly axial openings structured to provide selective fluid communication between said upstream enclosed space and one of said multiple housing assembly outlet passages.

9. The pressurized gas system of claim 4 wherein said cupper includes a plurality downstream pressure conduits and wherein:

said housing assembly at least one outlet passage includes a plurality of housing assembly outlet passages, the number of housing assembly outlet passages corresponding to the number of said downstream pressure conduits, wherein each said each housing assembly outlet passage is coupled to, and in fluid communication with, one of said downstream pressure conduits;

wherein said rotary valve body assembly at least one axial openings includes a plurality of axial openings, the number of axial openings corresponding to the number of said downstream pressure conduits;

each said rotary valve body assembly axial opening structured to provide selective fluid communication between said upstream enclosed space and one of said housing assembly outlet passages.

10. A pressurized gas system for a cupper, said cupper having at least one ram and at least one die structured to form a metal blank into a cup, wherein, after forming, the cup is disposed over the distal end of said at least one ram, said at least one ram having an ejection conduit extending therethrough, said ram ejection conduit having an inlet, said pressurized gas system comprising:

a surge tank structured to contain a pressurized gas, said surge tank having an outlet;

a motor having at least one drive shaft;

a rotary valve assembly having a housing assembly and a rotary valve body assembly, said housing assembly having at least one inlet passage, at least one outlet passage, said rotary valve assembly at least one inlet passage coupled to, and in fluid communications with, said surge tank having an outlet, said rotary valve body assembly disposed within said housing assembly and coupled to said motor, wherein said rotary valve body assembly is structured to selectively provide fluid communication therethrough;

at least one downstream pressure conduit, each downstream pressure conduit having an inlet and an outlet, said at least one downstream pressure conduit inlet coupled to, and in fluid communication with, said rotary valve assembly at least one outlet passage, said at least one downstream pressure conduit outlet coupled to, and in fluid communication with, at least one ram ejection conduit;

a controlled valve and a control unit;

said controlled valve coupled to, and in fluid communication with, said surge tank outlet and said rotary valve assembly at least one inlet passage, said controlled valve structured to be selectively configured electronically;

said control unit structured to provide an electronic valve configuration command, said control unit coupled to, and in electronic communication with, said controlled valve;

whereby said control unit is structured to configure said controlled valve;

wherein said at least one ram and at least one die includes multiple rams and multiple dies acting in cooperation, said cupper further including a manifold having an inlet and multiple outlets, each manifold outlet coupled to and in fluid communication with one of said multiple rams, and wherein:

said housing assembly at least one outlet passage includes one housing assembly outlet passage, said housing assembly outlet passage coupled to, and in fluid communication with, said manifold inlet.

* * * * *